United States Patent

[11] 3,572,744

[72] Inventor Richard L. Smith
2624 W. Second Ave., Durango, Colo. 81301
[21] Appl. No. 825,301
[22] Filed May 16, 1969
[45] Patented Mar. 30, 1971

[54] AUTOMOTIVE STEERING STABILIZERS
8 Claims, 5 Drawing Figs.

[52] U.S. Cl............................................. 280/90, 180/79.2
[51] Int. Cl............................................. B62d 9/00
[50] Field of Search............................... 280/90, 87, 87 (.4); 180/79.2; 188/97

[56] References Cited
UNITED STATES PATENTS
1,747,768 2/1930 Fuller.......................... 180/79.2X
1,958,810 5/1934 Berg............................ 280/90
2,178,073 10/1939 Hardy.......................... 280/87
2,261,821 11/1941 Altemus....................... 280/87
3,074,515 1/1963 MacLellan................... 280/90X FOREIGN PATENTS
223,132 10/1924 Great Britain................ 280/90

Primary Examiner—Benjamin Hersh
Assistant Examiner—Leslie J. Paperner
Attorney—R. H. Galbreath ABSTRACT: A double-acting hydraulic cylinder and piston positioned between, and connected to, the steering tie rod and the front axle of a vehicle. A bypass valve assembly, installed in the steering wheel drag link of said vehicle, hydraulically connected to opposite ends of said cylinder so that axial tension and axial pressure in said drag link will actuate said assembly to bypass hydraulic fluid to and from opposite ends of said cylinder.

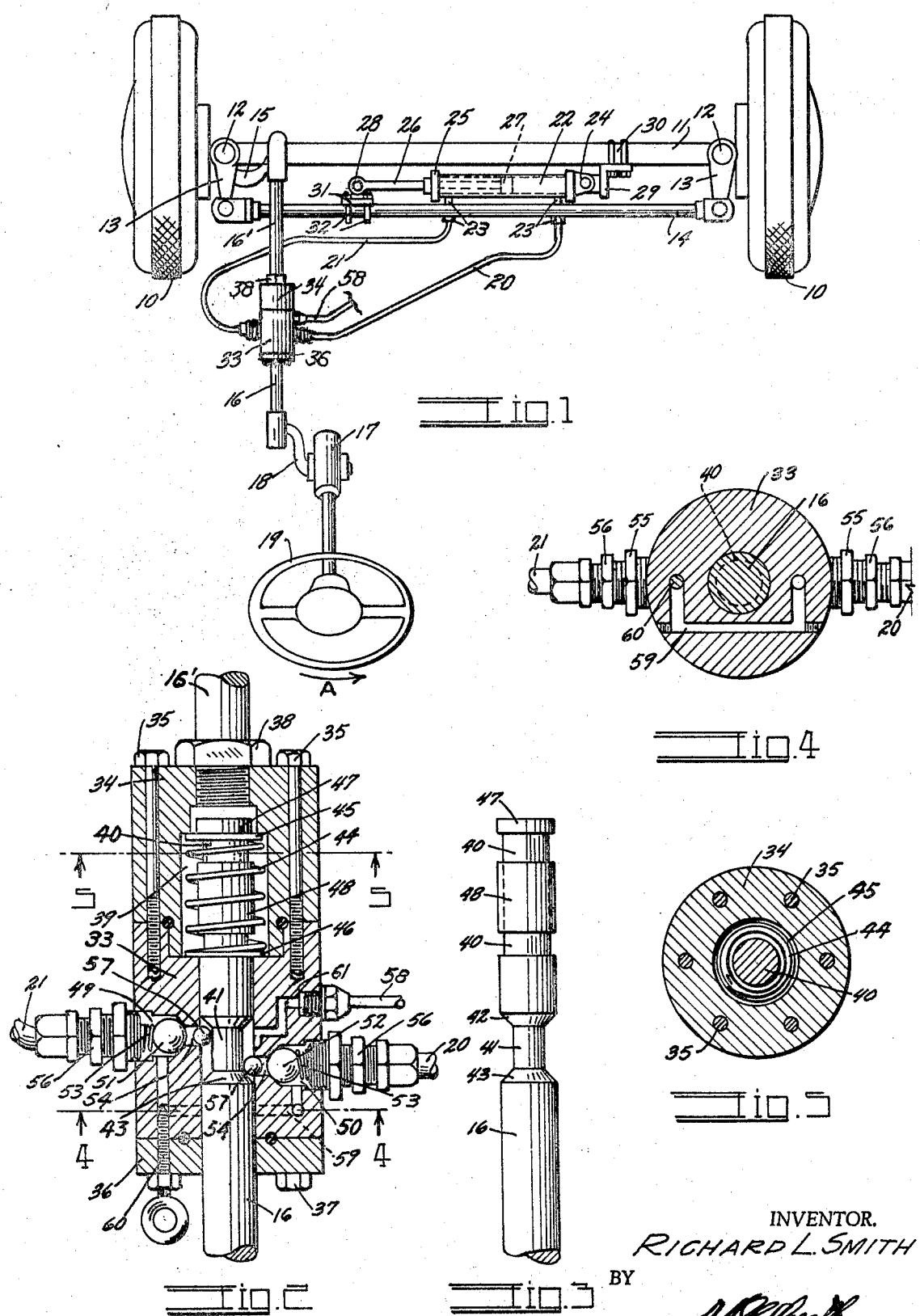

AUTOMOTIVE STEERING STABILIZERS

This invention relates to a steering stabilizer for automotive vehicles for assisting the driver in controlling the travel direction of the vehicle over various types of roads at various rates of speed. Attempts have been made to stabilize the lateral direction in which the steerable road wheels are directed by installing a shock absorber between the tie rod and the front axle of the vehicle to absorb and cushion lateral road shocks. These attempts have not been entirely satisfactory since they not only dampen the road shocks but also dampen rapid actuation of the steering wheel and result in sluggish steering.

The principal object of this invention is to provide an automotive steering stabilizer: which will lock the road wheels against lateral movement when the vehicle is at rest; which will allow the road wheels to be quickly and freely turned in either direction by actuation of the steering wheel; which, will prevent road shocks from turning the road wheels laterally except as directed by manual rotation of the steering wheel; which will prevent road shocks from jerking and spinning the steering wheel out of the driver's hands; and which can be adjusted to completely release the road wheels for free lateral movement for towing purposes.

Other objects and advantages reside in the detail construction of the invention, which is designed for simplicity, economy and efficiency. These will become more apparent from the following description.

In the following detailed description of the invention, reference is made to the accompanying drawing which forms a part hereof. Like numerals refer to like parts in all views of the drawing and throughout the description.

In the drawing:

FIG. 1 is a diagrammatic plan view, looking downwardly on an automotive steering system showing the location of this invention therein;

FIG. 2 is an enlarged horizontal, longitudinal, axial section of a bypass valve assembly which is installed in the conventional drag link of the system of FIG. 1 to apply this invention thereto;

FIG. 3 is a detail elevational view of a camshaft employed in the bypass valve assembly of FIG. 2;

FIG. 4 is a cross section through the bypass valve assembly taken on the line 4—4, FIG. 2; and FIG. 5 is a similar cross section taken on the line 5—5, FIG. 2.

In FIG. 1, conventional elements of an automotive steering system are designated by reference numerals as follows: dirigible road wheels 10; axle 11; steering knuckles 12; tie rod arms 13; tie rod 14; drag link arm 15; steering gearbox 17; steering arm 18; and steering wheel 19.

This invention includes two basic assemblies—a bypass valve assembly as shown in FIG. 2 and a hydraulic cylinder assembly as shown in FIG. 1—connected together by means of flexible hydraulic hoses 20 and 21.

The hydraulic cylinder assembly comprises a conventional double-acting hydraulic cylinder 22 provided with a hose coupling 23 at each of its extremities and with a mounting cap 24 at its one extremity and a bearing cap 25 at its other extremity. A piston rod 26 extends through, and in sealing engagement with, the bearing cap 25 and terminates in a conventional piston at its inner extremity, as indicated in broken line at 27, and in a mounting fitting 28 at its outer extremity. The mounting cap 24 is pivotally connected to a suitable axle clamp 29 which is clamped to the axle 11 in any suitable manner such as by means of U-bolts 30. The mounting fitting 28 is pivotally connected to a suitable rod clamp 31 which is clamped to the tie rod 14 such as by U-bolts 32. The clamps 29 and 31 are relatively positioned, on the axle 11 and the tie rod 14 so that, when the road wheels 10 are directed straight ahead, the piston 27 will be positioned approximately at the middle of the cylinder.

In conventional motor vehicles a continuous drag link connects the steering arm 18 to the drag link arm 15 to transmit steering motions to the road wheels. In this invention the usual continuous link is replaced by a three-part drag link consisting of a rear drag link portion 16 projecting rearwardly from a bypass valve assembly and a forward drag link portion 16' projecting forwardly from the valve assembly. The bypass valve assembly comprises a cylindrical valve section 33, and a similar cylindrical spring section 34, of like diameter, axially joined together by means of suitable clamp bolts 35. The rear extremity of the valve section 33 is closed by a circular bearing cap 36 joined thereto by means of suitable lag screws 37. The forward drag link portion 16' is axially threaded into, and projects forwardly from, the forward extremity of the spring section 34 and is locked therein by means of a suitable locknut 38. The rear drag link portion 16 extends axially through the bearing cap 36 and the valve section 33 into a spring chamber 39 in the spring section 34. The forward extremity of the rear drag link portion 16 is reduced in diameter where it passes into the spring chamber 39, as shown at 40. A cylindrical cam notch 41 is circumferentially indented in the rear drag link portion 16 rearwardly of the reduced diameter portion 40. The cam notch 41 is provided with an inclined forward wall 42 and a similar inclined rear wall 43.

A cylindrical spiral compression spring 44 surrounds the reduced diameter portion 40. The spring 44 is positioned between a forward washer 45 and a rear washer 46. The openings in the washers 45 and 46 are of a diameter to snugly slide along the reduced diameter portion 40. The rear washer 46 bears against the larger diameter portion of the drag link portion 16 and the forward spring washer 45 bears against a terminal ring flange 47 fixedly mounted on the forward extremity of the drag link portion 16 so as to maintain the spring 44 permanently compressed between the two washers. A spacing sleeve 48, of less length than the reduced diameter portion 40, surrounds and is permanently affixed to the latter intermediate the extremities thereof to limit the distance that the washers 45 and 46 can approach each other.

Two longitudinally spaced-apart ball valve seat chambers 49 and 50, provided with conventional ball valve seats, are formed in the sides of the valve section 33. A check valve ball 51 is positioned in the chamber 49 and a similar check valve ball 52 is positioned in the chamber 50 to close the seats therein.

Each valve ball is urged against its respective seat, by means of a spiral valve spring 53, to close a port 54 with which the cam notch 41 communicates. The valve balls 51 and 52 are maintained in position relative to their respective seats by means of relatively large, threaded nipples 55 and the valve springs 53 are urged against the valve balls by means of relatively smaller hose nipples 56. Spacing balls 57 are positioned in the ports 54 to urge the check valve balls 51 and 52 from their seats when the spacing balls 57 are contacted by the inclined end walls 42 and 43 of the notch 41 in consequence of longitudinal movement of the drag link portion 16.

The hoses 20 and 21 connect the threaded nipples 56 of the valve section 33 with the hose couplings 23 at the opposite ends of the hydraulic cylinder 22, as shown in FIG. 1, to provide a sealed bypass circuit between the opposite sides of the piston 27 through the bypass valve assembly. The circuit is maintained completely filled with low-pressure hydraulic fluid in any desired manner so as to prevent the entry or entrapment of air therein. This can be accomplished by forming a filling passage 61 in the side of the valve section 33 at the location of the cam notch 41 therein. A filling tube 58, shown broken away in FIGS. 1 and 2, extends from the filling passage 61 to a fluid supply such as to the hydraulic fluid reservoir of the vehicle. The supply line should be provided with check and pressure regulating valves to prevent flow from the stabilizer and to maintain a low ambient pressure therein.

OPERATION

It is believed the construction can be best understood by describing the operation thereof.

Let us assume that the vehicle is stationary with the hands removed from the steering wheel so that there is no stress in the drag link portions 16 and 16'. The forward spring washer 45 and the rear spring washer 46 are pressed against the forward and rear extremities, respectively of the spring chamber 39, by the bias of the spring 44, and the spacing balls 57 are positioned in the cam notch 41 so that the check valve balls 51 and 52 are closing their respective valve seats as shown in FIG. 2. The hydraulic fluid cannot now pass in either direction and the wheels 10 are locked against lateral movements until the steering wheel is again actuated.

Now let us assume that the steering wheel is turned to the left as indicated by the arrow A, to swing the wheels 10 so as to guide the vehicle to the left. This places the drag link portions 16 and 16' in compression so that the rear drag link portion 16 will be urged toward the forward drag link portion 16'. This causes the rear spring washer 46 to move forwardly to compress the spring 44. When the washer 46 contacts the spacing sleeve 48 compressive effort will be transmitted directly to the forward drag link portion 16' and to the drag link arm 15 to swing the wheels 10 to the left.

The forward movement of the drag link portion 16 in the bypass valve assembly will cause the inclined rearward wall 43 of the notch 41 to engage the rear spacing ball 57 so as to open the rear check ball 52 to allow fluid to flow from the right extremity of the cylinder 22 so that the piston 27 may move to the right therein.

As the piston moves to the right, the fluid will flow through the hose 20 past the open rear check ball 52 and the pressure thereof will hydraulically open the forward check valve ball 51 to allow the fluid to flow through the hose 21 to the left extremity of the cylinder 22 so that the piston may travel freely to the right to allow the wheels to freely swing to the left. Should road shocks attempt to swing the wheels to the right, the bypass flow will be reversed and the forward check ball 51 will instantly close to prevent the wheels from swinging to the right.

If the steering wheel be turned to the right to guide the vehicle to the right the reverse of the above will take place, that is, the drag link portions 16 and 16' will tend to separate and the forward washer 45 will compress the spring 44 to cause the forward inclined wall 42 of the cam notch 41 to open the forward check valve ball 51 so that fluid may flow from the left extremity of the cylinder 22 past the open valve ball 51 and hydraulically open the rear check valve ball 52 to allow the piston 27 to move to the left so that all of the advantages described above relative to a left turn will be obtained on the right turn.

To free the wheels for towing and for manually moving the vehicle a bypass passage 59 is formed in the valve section 33 communicating between the valve seat chambers 49 and 50 controlled by a needle valve 60 which extends rearwardly from the bearing cap. When the needle valve 60 is opened the check valve balls 51 and 52 will have no effect and the piston 27 can freely travel back and forth in the cylinder 22.

While a specific form of the invention has been described and illustrated herein, it is to be understood that the same may be varied within the scope of the appended claims, without departing from the spirit of the invention.

I claim:

1. A steering stabilizer, for application to the type of automotive steering systems having a front axle, a steering tie rod extending substantially parallel to said axle, and a steering-wheel-actuated drag link arm imparting reciprocal longitudinal movements to said tie rod, comprising:
   a. a double-acting fluid-filled hydraulic cylinder having a reciprocal piston rod projecting from one of its extremities;
   b. means for mounting said cylinder and piston rod to, and between, said axle and said tie rod so that the reciprocal movements of the latter will be imparted to said piston rod;
   c. a bypass valve assembly;
   d. conduits connecting the opposite ends of said cylinder with said bypass assembly so that said assembly will control the flow of fluid between the opposite extremities of said cylinder in consequence of actuation of said piston rod;
   e. a forward drag link portion fixedly mounted in said bypass assembly and extending forwardly therefrom to said drag link arm to actuate the latter;
   f. a rear drag link portion slidably mounted in said bypass assembly rearwardly of an in axial alignment with said forward drag link portion and arranged, when drawn rearwardly from said forward portion, to open the bypass valve assembly; and
   g. spring means in said assembly urging said rear portion axially toward said forward portion to close the bypass valve assembly.

2. A steering stabilizer as described in claim 1 having:
   a. a cam notch formed in said rear portion; and
   b. a forward outwardly opening check valve and a rear outwardly opening check valve in said assembly each check valve being spring loaded and having valve-opening means extending into said notch so that when said rear drag link portion is forced forwardly in said assembly the rear check valve will be opened to allow fluid to flow from one end of said cylinder and when pulled rearwardly in said assembly the forward check valve will be opened to allow fluid to flow from the other end of said cylinder.

3. A steering stabilizer as described in claim 2 having:
   a. a bypass passage in said assembly communicating between said conduits and bypassing said forward and rear check valves; and
   b. a manually actuated bypass valve controlling said latter passage independently of the control exerted by said check valves.

4. A steering stabilizer as described in claim 2 in which the spring means comprises:
   a. a spring-receiving portion formed in said forward drag link portion;
   b. a spring cavity in said assembly about said spring-receiving portion;
   c. a washer axially positioned about said spring receiving portion at each end of the latter;
   d. a cylindrical spiral compression spring surrounding said spring-receiving portion and urging said washers resiliently apart against the ends of said cavity; and
   e. spring-actuating means projecting from said drag link portion beyond the ends of said spring to alternately engage each washer and urge it against the bias of said spring toward the other washer as said drag link portion is moved forward and back in said assembly.

5. A steering stabilizer as described in claim 4 having stop means fixedly positioned on said spring-receiving portion between and in spaced relation to said projecting means for limiting the distance each washer may travel toward the other washer.

6. A steering stabilizer as described in claim 5 in which the ends of said cavity, the spring-actuating means and the cam notch are relatively and axially spaced from each other so that when the two washers are both in contact with ends of said cavity the valve opening means of both said check valves will be positioned in the cam notch so that both valves will be resiliently closed.

7. A steering stabilizer as described in claim 6 in which the stop means of claim 5 is spaced from the adjacent washers at a distance which will permit the drag link portion to move only sufficiently to open one check valve at the termination of its movement in each direction.

8. A steering stabilizer as described in claim 7 in which the spring-receiving portion is of less diameter than said drag link portion so that the increase in diameter at the extremities of the spring-receiving portion will form the spring-actuating means of claim 4.